Figure 1:
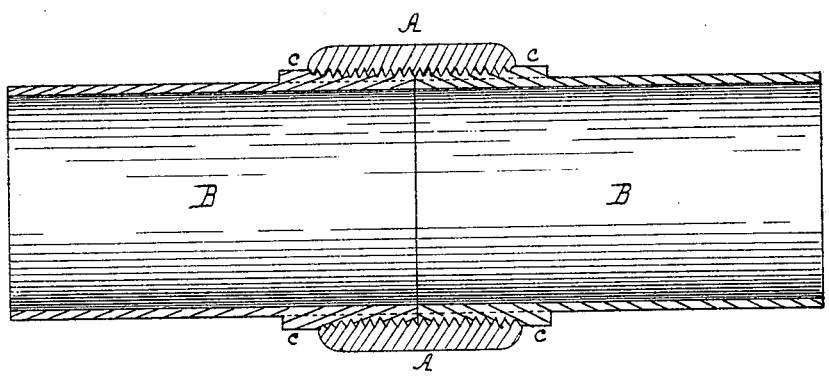

(No Model.)

P. PATTERSON.
TUBE COUPLING.

No. 273,591. Patented Mar. 6, 1883.

Witnesses
J. G. Kay
Wm. A. Stone

Inventor
Peter Patterson
by James T. Kay
Attorney

UNITED STATES PATENT OFFICE.

PETER PATTERSON, OF McKEESPORT, PENNSYLVANIA, ASSIGNOR TO THE NATIONAL TUBE WORKS COMPANY, OF BOSTON, MASSACHUSETTS.

TUBE-COUPLING.

SPECIFICATION forming part of Letters Patent No. 273,591, dated March 6, 1883.

Application filed June 12, 1882. (No model.)

*To all whom it may concern:*

Be it known that I, PETER PATTERSON, of McKeesport, in the county of Allegheny and State of Pennsylvania, have invented a new and useful Improvement in Tube-Couplings; and I do hereby declare the following to be a full, clear, and exact description thereof, reference being had to the accompanying drawings, forming a part of this specification.

My invention relates to certain improvements in the couplings used with wrought-metal tubing for Artesian and other wells, pipe-lines, and general purposes in the transportation of liquids, gases, &c.

The common coupling most generally employed for uniting tubing consists of a socket screw-threaded on the interior, and a corresponding screw-thread formed on the ends of each length of tubing, the tubing being screwed into the socket and thus connected. As it is necessary, especially in Artesian wells, that a secure union be formed between the several lengths of tubing, these screw-threads are necessarily cut deep and large to give sufficient hold to the joint and prevent the "stripping" of the thread by the weight of the tubing, by the expansion or contraction of the tubing, or otherwise; and in many cases the tubing is necessarily formed of thick metal to enable the threaded ends screwed into the coupling-socket to stand the requisite pressure-test, while the body of the tube is much thicker than necessary, and an unthreaded tube of one-half the thickness would be sufficiently strong to stand the same or a greater test. As a large portion of this tubing is used for pipe-lines and similar purposes, where it is often subjected to severe lateral or bending strain, it is found that the threaded ends screwed into the couplings are so weakened by the deep screw-thread that they are very liable to break at the coupling, and for this reason thick tubing has necessarily been employed. This increased thickness of the tubing adds materially to the weight and cost of the tubing, and the extra weight of the tubing increases the cost of shipment—an important item with large shipments at long distances.

The object of my invention is to form a connection between the tube-coupling and thin and light tubing, which, while having the necessary depth of screw-thread to prevent the stripping of the thread, is sufficiently strong at the threaded portion to stand the same pressure, drawing, or bending strain as the body of the tubing.

To this end it consists in a tube-coupling formed of thin tubing having an annular re-enforcement welded to the end thereof, in combination with a coupling-socket engaged therewith by deep screw-threads, the deep screw-threads extending into the re-enforced end of the tubing, so that there is as great or a greater thickness of metal in the tubing at the coupling after the formation of the screw-threads than in the unthreaded body of the tubing, and it is therefore adapted to withstand the same pressure, drawing, or bending strain.

To enable others skilled in the art to make and use my invention, I will describe the same more fully, referring for that purpose to the accompanying drawings, in which—

Figure 2:
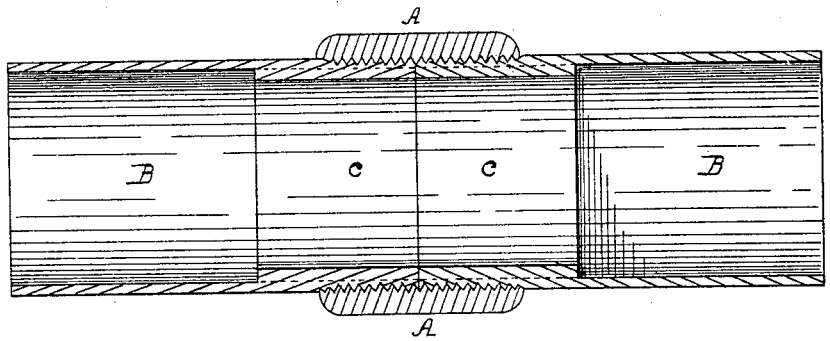
Figure 3:
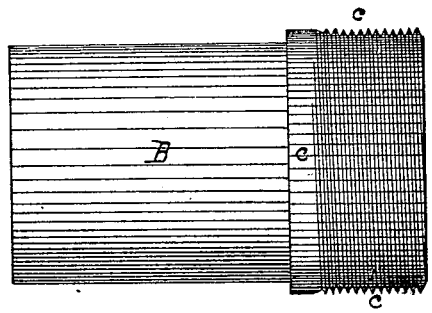

Figure 1 is a longitudinal section of my improved coupling where the re-enforcements are welded around the tubing. Fig. 2 is a like view where the re-enforcements are welded within the tubing, and Fig. 3 is a side view of one end of the tubing.

Like letters of reference indicate like parts in each.

In the drawings, A represents the coupling-socket, which is generally formed of wrought-iron or steel, and has the usual deep screw-thread employed to unite heavy or thick tubing cut on the interior thereof, the threads being slightly vanishing, if desired.

B B are the ends of two lengths of tubing connected by the socket A. They are made, by the ordinary method of bending and welding, from thin plate metal, it being only necessary that the tubing is of such thickness as will withstand, when unweakened by the cutting of the screw-thread, the pressure to which the finished tube is to be subjected, so that a much lighter tube than usually employed for the same pressure-strain may be used. The usual practice is to employ tubing about one-half the thickness of that used to form the same strength of pipe where the screw-thread is cut directly into the body of the tubing.

On each end of the tubing, where it is to be connected in the coupling-socket, is welded the re-enforcement c, this re-enforcement extending from the end of the tubing beyond the screw-threads by which it is connected to the coupling. This re-enforcement can either be welded on the outside around the tubing, as shown in Figs. 1 and 3, or within the tubing, welded to its inner surface, as shown in Fig. 2. It is generally formed of a metal plate about the same thickness or gage as the body of the tubing, or of a short piece of tubing the inner diameter of which corresponds to the outer diameter of the tubing, and can be welded to the tube by means of a power or other hammer, and a mandrel inserted in the tube in ways known to the skilled mechanic. The line of weld between the tubing and re-enforcement is shown by dotted lines in the two sectional views. The usual deep screw-thread employed to unite heavy or thick tubing, and corresponding to the thread of the coupling-socket, is cut on the re-enforced ends of the tubing, the thread being cut in the re-enforcements and leaving the body of the tubing intact when they are welded around the tubing, and in the body of the tubing leaving the re-enforcements intact when they are welded within it.

My improved tube-coupling is employed in the usual manner, the sockets screwing onto the re-enforcements welded around the tubing, or onto the tubing where the re-enforcements are welded within the pipe, as the case may be. An examination of the drawings will show that if the tubing were connected by as deep a screw-thread cut in the body of the thin tubing when not re-enforced the tubing would be capable of resisting but little pressure, and would be liable to breakage in the screw-threads if subjected to a very slight lateral or bending strain. Where, however, the coupling or union is made in the ends re-enforced as above described, a thickness of metal equal to or greater than that of the body of the tubing is left unaffected by the screw-threads, and consequently, instead of the joints being the weakest parts of the tubing, they are as strong as or stronger than the body of the tubing, being capable of withstanding as great or a greater pressure, drawing, or bending strain as the tubing itself. As I am thus enabled to employ a deep screw-thread with this thin and light metal tubing, it can be employed for the same purposes as the ordinary thick tubing, and I save almost one-half the metal needed for the same strength of tubing, and, as the weight is reduced in the same proportion, effect a large and important saving in cost of transportation.

Before my invention conical rings or ferrules have been welded or soldered on the ends of the ordinary thick boiler-tubes, and the conical rings expanded in conical holes in the boiler-plates; but by this construction the result desired by me was not obtained, as these rings were secured on the ordinary thick boiler-tubes and were not threaded, and provided no means whatever for coupling different lengths of tubing, having no reference to that subject which is the object of my invention. The ordinary thick boiler-tubing has had a ring or ferrule welded around one end thereof and the ordinary shallow screw-thread cut at each end thereof, so that both the end with the threaded ferrule and the ordinary threaded end may be screwed into their respective boiler-plates at the same time, one plate having a larger threaded hole for the reception of the ferrule. By this construction the result desired by me was not obtained, as the shallow screw-thread did not materially weaken the tubing, and the ferrule was not employed and did not act to strengthen any weak part of the tubing, whereas I have, by the employment of my re-enforcements at the ends of the thin and light metal tubing, formed a coupling for such thin tubing, having the necessary deep screw-threads to prevent stripping, and yet sufficiently strong to withstand the same pressure, drawing, or bending strain as the body of the tubing. Tubing has also been formed with its ends thickened by upsetting, and the connecting screw-threads formed on the upset portions; but the upsetting of the ends was difficult to accomplish without buckling or bending the tubing out of shape, requiring expensive machinery for the purpose, and was almost impossible with the light metal tubing employed by me. It was also liable to greatly weaken the tubing by breaking up and destroying the fiber of the metal, thus so detracting from its strength that the upset ends were scarcely stronger than the body of the tubing. By my invention the coupling ends are re-enforced for the reception of the deep screw-threads by a less expensive operation, which can be employed with very thin metal tubing and without in any way destroying the fiber of or weakening the metal of the tubing.

What I claim as my invention, and desire to secure by Letters Patent, is—

A thin metal tubing having an annular re-enforcement welded to the end thereof, in combination with a coupling-socket engaged therewith by deep screw-threads, substantially as and for the purposes set forth.

In testimony whereof I, the said PETER PATTERSON, have hereunto set my hand.

PETER PATTERSON.

Witnesses:
JAMES I. KAY,
F. G. KAY.